(12) United States Patent
Kishida

(10) Patent No.: US 8,867,792 B2
(45) Date of Patent: Oct. 21, 2014

(54) ENVIRONMENT RECOGNITION DEVICE AND ENVIRONMENT RECOGNITION METHOD

(75) Inventor: Taichi Kishida, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 338 days.

(21) Appl. No.: 13/472,726

(22) Filed: May 16, 2012

(65) Prior Publication Data

US 2012/0294484 A1 Nov. 22, 2012

(30) Foreign Application Priority Data

May 19, 2011 (JP) ................................ 2011-112006

(51) Int. Cl.
*G06K 9/00* (2006.01)
*G06K 9/46* (2006.01)

(52) U.S. Cl.
CPC .......... *G06K 9/00805* (2013.01); *G06K 9/4633* (2013.01)
USPC ............................ 382/104; 382/204; 382/281

(58) Field of Classification Search
CPC .......... G06K 9/00201; G06K 9/00791; G06K 9/00805; G06K 9/00818; G06K 9/4604; G06K 9/4633; G06K 9/6202; G06T 7/0085; G06T 7/0095; G06T 2207/20061; G06T 2207/30252; G06T 2207/30261
USPC .................. 382/104, 106, 199, 204, 217, 281
See application file for complete search history.

(56) References Cited

U.S. PATENT DOCUMENTS

2010/0067805 A1 * 3/2010 Klefenz ........................ 382/201

FOREIGN PATENT DOCUMENTS

| JP | 3349060 B2 | 11/2002 | ................ G06T 1/00 |
| JP | 2003-99762 A | 4/2003 | ................ G06T 1/00 |

* cited by examiner

*Primary Examiner* — Andrew W Johns

(74) *Attorney, Agent, or Firm* — McDermott Will & Emery LLP

(57) ABSTRACT

There are provided an environment recognition device and an environment recognition method. the environment recognition device retains beforehand shape information that is information on a shape of a specific object; obtains a luminance of each of target portions, formed by dividing a detection area, and extracting a target portion including an edge; obtains a relative distance of the target portion including an edge; and determines a specific object indicated with the shape information by performing a Hough transform on the target portion having the edge based on the shape information according to the relative distance.

7 Claims, 10 Drawing Sheets

FIG. 4A
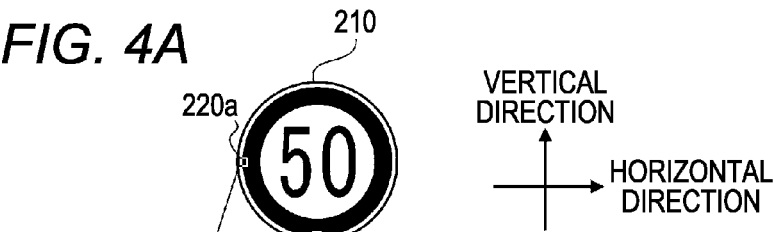
FIG. 4B 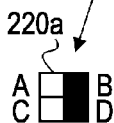 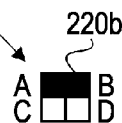 FIG. 4C
FIG. 4D   FIG. 4E FIG. 5
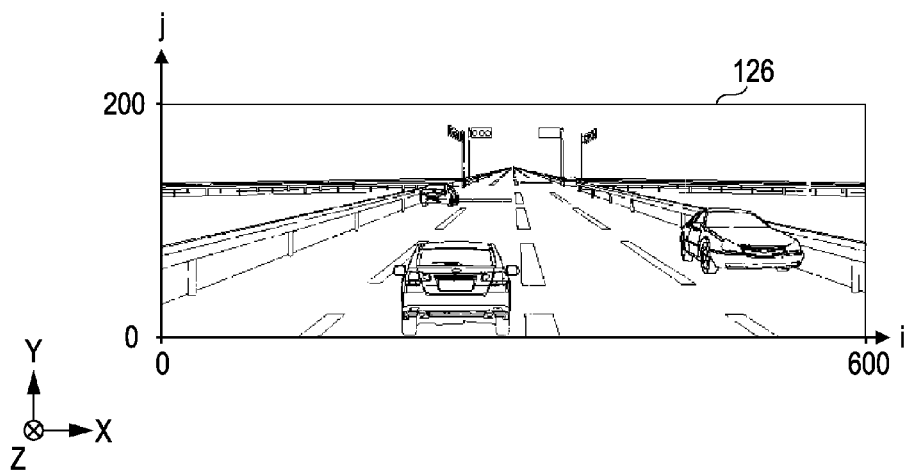

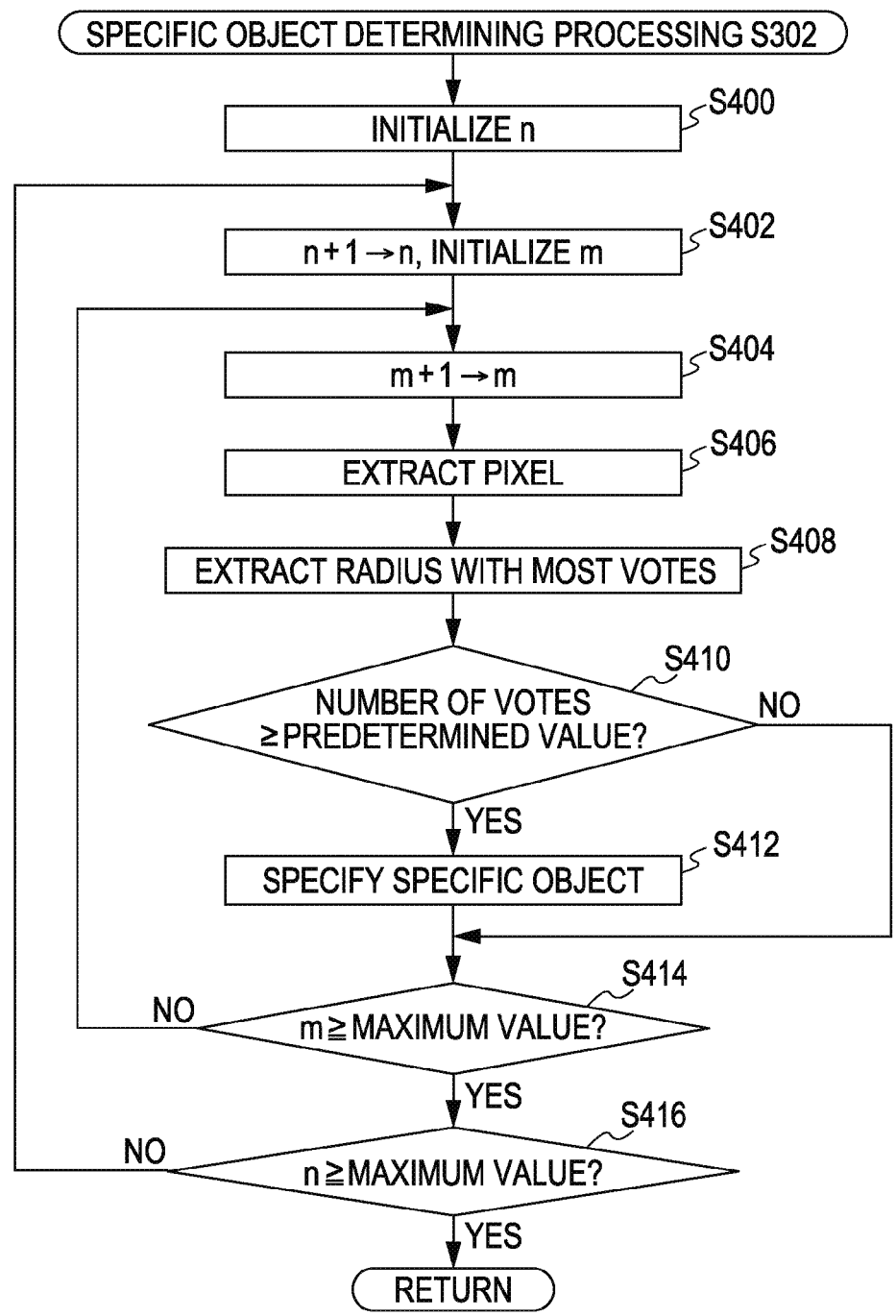

ENVIRONMENT RECOGNITION DEVICE AND ENVIRONMENT RECOGNITION METHOD

CROSS-REFERENCE TO RELATED APPLICATIONS

The present application claims priority from Japanese Patent Application No. 2011-112006 filed on May 19, 2011, the entire contents of which are hereby incorporated by reference.

BACKGROUND OF THE INVENTION

1. Field of the Invention

The present invention relates to an environment recognition device and an environment recognition method for recognizing a target object based on luminances of the target object in a detection area.

2. Description of Related Art

Conventionally, a technique has been known that detects a target object such as an obstacle including a vehicle and a traffic light located in front of a subject vehicle for performing control to avoid collision with the detected target object and to maintain a safe distance between the subject vehicle and the preceding vehicle for example, Japanese Patent No. 3349060 (Japanese Patent Application Laid-Open (JP-A) No 10-283461).

Further, in such techniques, there is a technique that performs more advanced control. Specifically, it not only specifies a target object uniformly as a solid object, but further determines whether the detected target object is a preceding vehicle that is running at the same speed as the subject vehicle or a fixed object that does not move. In this case, when the target object is detected by capturing an image of a detection area, it is necessary to extract (cut out) the target object from the captured image before specifying what the target object is.

One way of extracting a target object is to group pixels with a same luminance in the image in to a target object. However, the original luminance of the target object might not be obtained due to the influence by environment light depending upon the image capturing condition or due to a change over time (fading) of the target object itself. In view of this, there has been proposed a method in which an edge generated due to the difference in luminance between pixels is extracted, and a target object is specified through a shape formed by this edge.

For example, there is known a technique that extracts a pixel (edge pixel) having an edge from a captured image based on a derivative value between adjacent pixels, derives a histogram (distance distribution) of the edge pixel in the width direction and in the height direction of the image, and estimates a region corresponding to its peak as an edge of a target object. There is also disclosed a technique for determining whether a target object is a vehicle through a comparison between a fusion pattern based on a histogram and a dictionary pattern stored beforehand (e.g., JP-A No. 2003-99762).

There is also disclosed a technique of extracting a target object having a perfect geometric shape from a target object in which a part of the geometric shape is missing, by using a so-called Hough transform for detecting a geometric shape such as a circle or straight line from an image including an edge image. In this technique, circles with a plurality of sizes including an edge image extracted from a detection region are estimated, the Hough transform is executed to extract the most suitable circle from the circles with different sizes, in order to extract a circular road sign, for example.

However, in the technique of extracting the most suitable circle by using the Hough transform, a plurality of possible circles with different sizes are taken into consideration on for one edge image, and the Hough transform is performed on each of the plurality of possible circles with different sizes (voting table). Therefore, the processing load is heavy, resulting in chat a large storage region of a memory might be occupied. Since this process is performed on all edges in the image, the processing load and the occupied storage region in a memory become very large.

SUMMARY OF THE INVENTION

The present invention is accomplished in view of the foregoing problems, and aims to provide an environment recognition device and an environment recognition method that can enhance the efficiency in specifying a target object by reducing a processing load and a storage region in a memory.

In order to solve the above problems, an aspect of the present invention provides an environment recognition device that includes: a data retaining unit that retains shape information that is information on a shape of a specific object; an edge extracting unit that obtains a luminance of each of target portions, formed by dividing a detection area of a luminance image, and extracts a target portion forming an edge; a position information obtaining unit that obtains a relative distance of the target portion forming an edge; and a specific object determining unit that determines a specific object indicated with the shape information by performing a Hough transform on a position of the target portion forming the edge based on the shape information according so the relative distance. The shape of the specific object may a circle.

The specific object determining unit may specify a center of a circle on which a target portion forming an edge is, with limiting the presence of the center in a range vertical to a direction in which the edge extends.

The position information obtaining unit may also obtain a height of the target portion forming the edge from a road surface, and the specific object determining unit may determine a specific object indicated by the shape information only from the target portions included in a predetermined partial search region based on the relative distance and the height from the road surface.

In order to solve the above problems, another aspect of the present invention provides an environment recognition method that includes: retaining beforehand shape information that is information on a shape of a specific object; obtaining a luminance of each of target portions, formed by dividing a detection area of a luminance image, and extracting a target portion forming an edge; obtaining a relative distance of the target portion forming an edge; and determining a specific object indicated with the shape information by performing a Hough transform on a position of the target portion forming the edge based on the shape information according to the relative distance.

BRIEF DESCRIPTION OF THE SEVERAL VIEWS OF THE DRAWINGS

FIGS. 4A to 4F are explanatory diagrams for explaining an operation of an edge extracting unit;

FIG. 5 is an explanatory diagram for explaining conversion into three-dimensional position information performed by a position information obtaining unit;

FIG. 12 is a flowchart illustrating a flow of determining processing of a specific object.

DETAILED DESCRIPTION OF THE INVENTION

Figure 1:
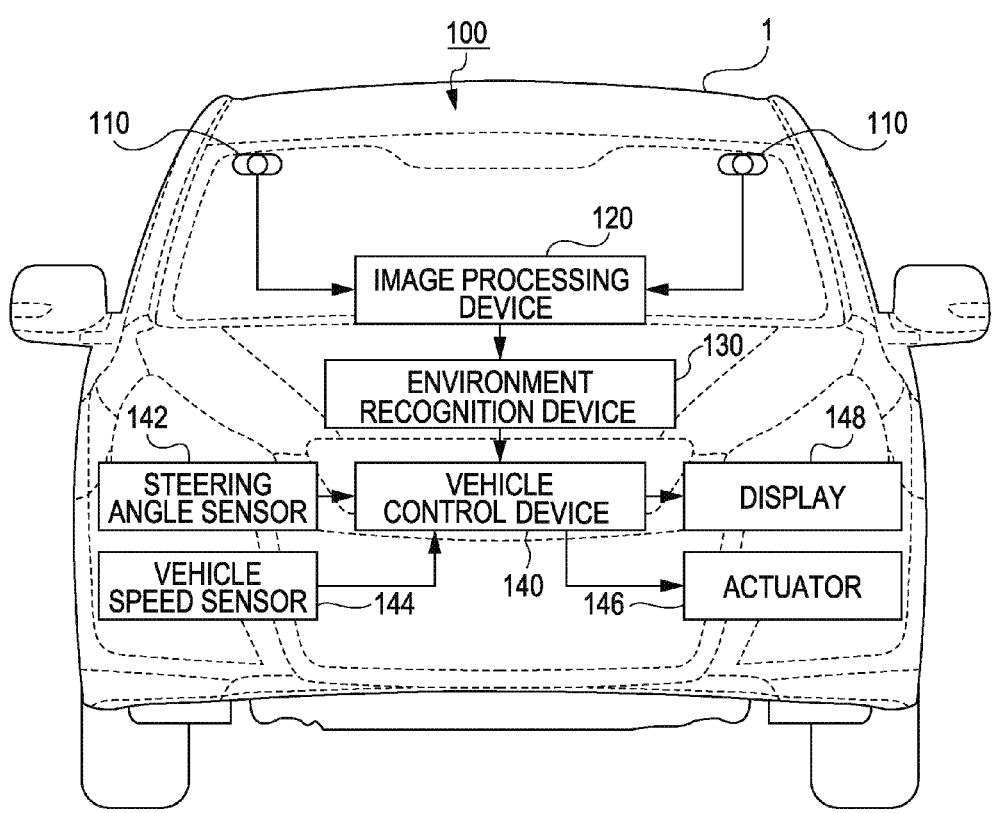
FIG. 1 is a block diagram illustrating a connection relationship in an environment recognition system.

A preferred embodiment of the present invention will be hereinafter explained in detail with reference to attached drawings. The size, materials, and other specific numerical values shown in the embodiment are merely exemplification for the sake of easy understanding of the invention, and unless otherwise specified, they do not limit the present invention. In the specification and the drawings, elements having substantially same functions and configurations are denoted with same reference numerals, and repeated explanation thereabout is omitted. Elements not directly related to the present invention are omitted in the drawings.

(Environment Recognition System 100)

FIG. 1 is a block diagram illustrating connection relationship in an environment recognition system 100. The environment recognition system 100 includes image capturing devices 110, an image processing device 120, an environment recognition device 130, and a vehicle control device 140 that are provided in a vehicle 1.

The image capturing devices 110 include an imaging element such as a CCD (Charge-Coupled Device) and a CMOS (Complementary Metal-Oxide Semiconductor), and can obtain a color image, that is, luminances of three color phases (red, green, blue) per pixel. In this case, a color image captured by the image capturing devices 110 is referred to as luminance image and is distinguished from a distance image to be explained later. The image capturing devices 110 are disposed to be spaced apart from each other in a substantially horizontal direction so that optical axes of the two image capturing devices 110 are substantially parallel in a proceeding direction of the vehicle 1. The image capturing device 110 continuously generates image data obtained by capturing an image of a target object existing in a detection area in front of the vehicle 1 at every 1/60 seconds (60 fps), for example. In this case, the target object may be not only an independent three-dimensional object such as a vehicle, e, a traffic light, a road, and a guardrail, but also an illuminating portion such as a road sign, a tail lamp, a turn signal, a traffic light that can be specified as a portion of a three-dimensional object. Each later-described functional unit in the embodiment performs processing in response to the update of such image data.

The image processing device 120 obtains image data from each of the two image capturing devices 110, and derives, based on the two pieces of image data, parallax information including a parallax of any block (a set of a predetermined number of pixels) in the image and a position representing a position of the any block in the image. Specifically, the image processing device 120 derives a parallax using so-called pattern matching that searches a block in one of the image data corresponding to the block optionally extracted from the other image data. The block is, for example, an array including four pixels in the horizontal direction and four pixels in the vertical direction. In this embodiment, the horizontal direction means a horizontal direction for the captured image, and corresponds to the width direction in the real world. On the other hand, the vertical direction means a vertical direction for the captured image, and corresponds to the height direction in the real world.

One way of performing the pattern matching is to compare luminance values (Y color difference signals) between two image data by the block indicating any image position. Examples include an SAD (Sum of Absolute Difference) obtaining a difference of luminance values, an SSD (Sum of Squared intensity Difference) squaring a difference, and an NCC (Normalized Cross Correlation) adopting the degree of similarity of dispersion values obtained by subtracting a mean luminance value from a luminance value of each pixel. The image processing device 120 performs such parallax deriving processing on all the blocks appearing in the detection area (for example, 600 pixels×200 pixels). In this case, the block is assumed to include 4 pixels×4 pixels, but the number of pixels in the block may be set at any value.

Although the image processing device 120 can derive a parallax for each block serving as a detection resolution unit, it is impossible to recognize what kind of target object the block belongs to. Therefore, the parallax information is not derived by the target object, but is independently derived by the resolution (for example, by the block) in the detection area. In this embodiment, an image obtained by associating the parallax information thus derived (corresponding to a later-described relative (distance) with image data is referred to as a distance image.

Figure 2A:
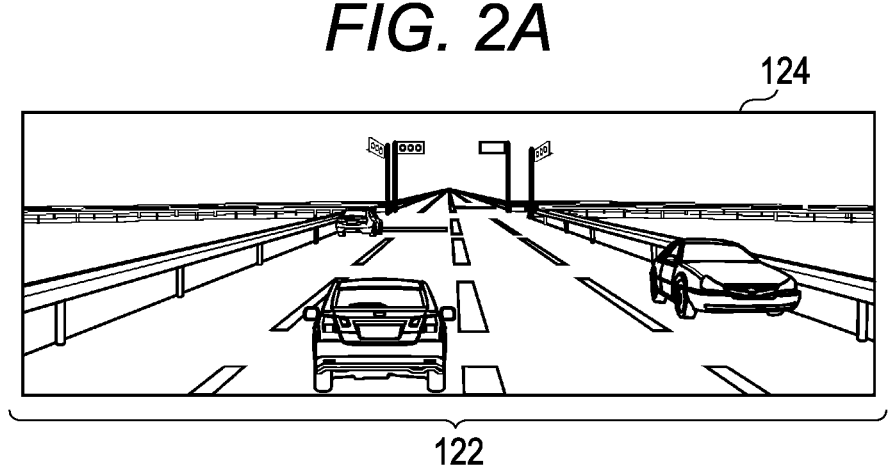
FIGS. 2A and 2B are explanatory diagrams for explaining a luminance image and a distance image.
Figure 2B:
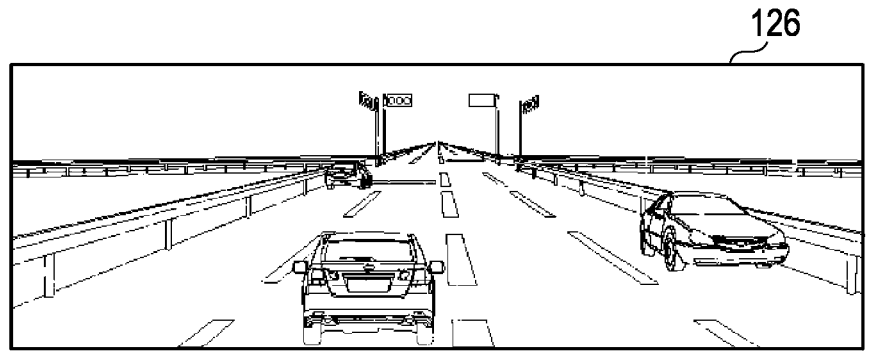

FIGS. 2A and 2B are explanatory diagrams for explaining a luminance image 124 and a distance image 126. For example, Assume that the luminance image (image data) 124 as shown in FIG. 2A is generated with regard to a detection area 122 by the two image capturing devices 110. Here, for the sake of easy understanding, only one of the two luminance images 124 is schematically shown. The image processing device 120 obtains a parallax for each block from such luminance image 124, and forms the distance image 126 as shown in FIG. 2B. Each block of the distance image 126 is associated with a parallax of the block. In the drawing, for the sake of explanation, a block from which a parallax is derived is indicated by a black dot.

The parallax can be easily specified at the edge portion (portion where there is contrast between adjacent pixels) of objects, and therefore, the block from which parallax is derived, which is denoted with black dots in the distance image 126, is likely to also be an edge in the luminance image 124. Therefore, the luminance image 124 as shown in FIG. 2A and the distance image 126 as shown in FIG. 2B are similar in terms of outline of each target object.

The environment, recognition device 130 obtains the luminance image 124, and specifies a specific object having a predetermined shape in the detection area 122 based on an edge of the luminance in the luminance image 124. The environment recognition device 130 also obtains the distance image 126 from the image processing apparatus 120 and uses a so-called stereo method to convert the parallax information for each block in the detection area 122 of the distance image 126 into three-dimensional position information including a relative distance. The relative distance is used for specifying the specific object. The stereo method is a method using a triangulation method to derive a relative distance of a target object with respect to the image capturing device 110 from the parallax of the target object. The environment recognition device 130 will be explained later in detail.

The vehicle control device 140 avoids a collision with the target object specified by the environment recognition device 130 and performs control so as to maintain a safe distance from the preceding vehicle. More specifically, the vehicle control device 140 obtains a current cruising state of the vehicle 1 based on, for example, a steering angle sensor 142 for detecting an angle of the steering and a vehicle speed sensor 144 for detecting a speed of the vehicle 1, thereby controlling an actuator 146 to maintain a safe distance from the preceding vehicle. The actuator 146 is an actuator for vehicle control used to control a brake, a throttle valve, a steering anode and the like. When collision with a target object is expected, the vehicle control device 140 displays a warning (notification) of the expected collision on a display 148 provided in front of a driver, and controls the actuator 146 to automatically decelerate the vehicle 1. The vehicle control device 140 can also be integrally implemented with the environment recognition device 130.

(Environment Recognition Apparatus 130)

Figure 3:
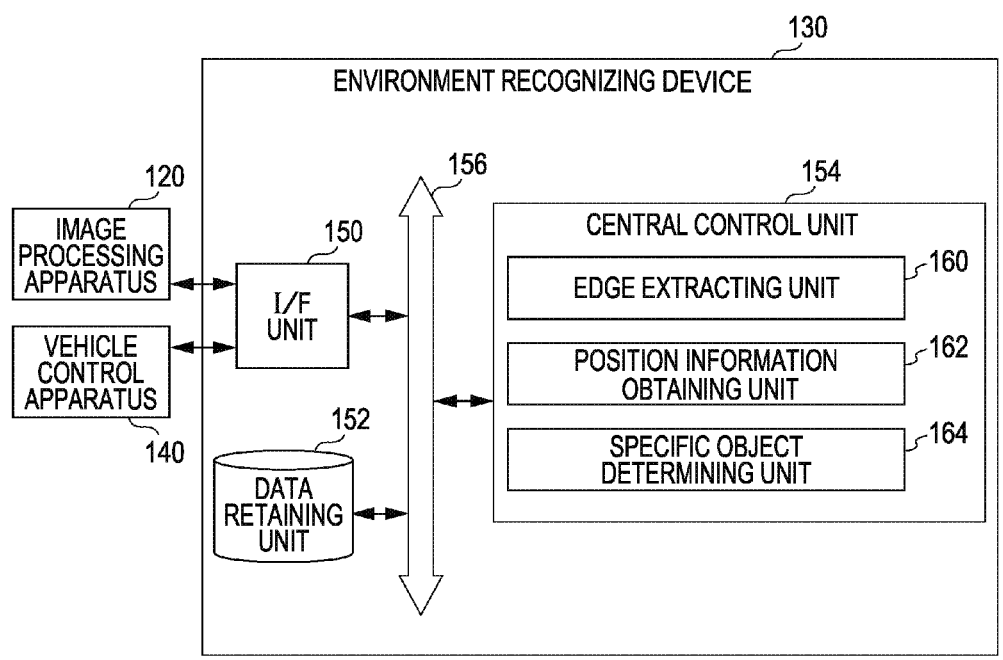
FIG. 3 is a functional block diagram schematically illustrating functions of an environment recognition device.

FIG. 3 is a functional block diagram schematically illustrating functions of an environment recognition device 130. As shown in FIG. 3, the environment recognition device 130 includes an I/F unit 150, a data retaining unit 152, and a central control unit 154.

The I/F unit 150 is an interface for interactive information exchange with the image processing device 120 and the vehicle control device 140. The data retaining unit 152 is constituted by a RAM, a flash memory, an HDD and the like, and retains at specific object table and various kinds of information required for processings performed by functional units explained below. In addition, the data retaining unit 152 temporarily retains the luminance image 124 received from the image processing device 120. In the specific object table, a specific object is associated with shape information that is information on a shape thereof. The shape information is the information with which a shape of a specific object can be specified. When a specific object is circular, for example, the specific object table retains a radius thereof (for example, 30 cm) in the real world.

The central control unit 154 is comprised of a semiconductor integrated circuit including, for example, a central processing unit (CPU), a ROM storing a program and the like, and a RAM serving as a work area, and controls the I/F unit 150 and the data retaining unit 152 through a system bus 156. In the present embodiment, the central control unit 154 also functions as an edge extracting unit 160, a position information obtaining unit 162, and a specific object determining unit 164.

The luminance obtaining unit 160 obtains luminances by the target portion (pixels) (luminances of three color phases (red, green, and blue) per pixel) from the received luminance image 124, determines whether or not there is an edge based on the difference in the luminances among pixels in each of target portions formed by dividing the detection area, and extracts a target portion having an edge. At this time, the edge extracting unit 160 also derives a direction in which the edge extends, the direction being utilized by the later-described specific object determining unit 164 (hereinafter merely referred to as an edge extending direction).

Specifically, the edge deriving unit 160 derives the edge direction based on a difference between totals of the luminances in two left and right regions that are formed by dividing a target portion (here, 2×2 pixels) in the vertical direction (hereinafter merely referred to as a horizontal-direction component), and a difference between totals of the luminances in two upper and lower regions that are formed by dividing the target portion in the horizontal direction (hereinafter merely referred to as a vertical-direction component).

Figure 4F:
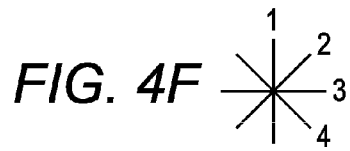

FIGS. 4A to 4F are explanatory diagrams for explaining an operation of an edge extracting unit 160. It is assumed here that a road sign 210 illustrated in FIG. 4A is displayed on part of the luminance image 224. It is also assumed that a luminance distribution in FIG. 4B is obtained by enlarging any target portion 220a in the region 212, whereas a luminance distribution in 4C is obtained by enlarging any another target portion 220b.

It is also assumed that in FIG. 4B the luminance range is set to 0 to 255, a white-out area corresponds to luminance "200", and a black-out area corresponds to luminance "0". In the present description, the luminance of the upper-left pixel of the block is expressed as A, the luminance of the upper-right pixel is expressed as B, the luminance of the lower-left pixel is expressed as C, and the luminance of the lower-right pixel is expressed as D. Furthermore the horizontal-direction component of the edge direction is defined as (A+B)−(C+D), and the vertical-direction component of the edge direction is defined as (A+C)−(B+D).

The horizontal-direction component of the target portion 220a in the edge direction illustrated in FIG. 4B is calculated as (A+B)−(C+D)=(200+0)−(200+0)=0, while the vertical-direction component in the edge direction is calculated as (A+C)−(B+D)=(200+200)−(0+0)=+400. Since the absolute value of the vertical-direction component is not smaller than 100, the target portion 220a is determined as an edge. Since the horizontal-direction component is "C", and the vertical-direction component is "+400", the edge extending direction is the vertical direction as illustrated in FIG. 4D. It is to be noted that it is only necessary to determine how much the extending segment of the edge in the edge extending direction tilts with respect to the image. Therefore, the strict direction is not needed, that is, it is not necessary to determine whether the edge extending direction is upward or downward in the vertical direction.

Similarly, the horizontal-direction component of the target portion 220b illustrated in FIG. 4C in the edge direction is calculated as (A+B)−(C+D)=(0+0)−(200+200)=−400, while the vertical-direction component in the edge direction is calculated as (A+C)−(B+D)=(0+200)−(0+200)=0. Since the absolute value of the horizontal-direction component is smaller than 100, the target portion 220b is determined to be an edge. Since the horizontal-direction component becomes "−400", and the vertical-direction component becomes "+0", the edge extending direction is the horizontal direction as illustrated in FIG. 4E.

The configuration described above in which a half region is subtracted from the other half region in the block can eliminate offset and noise of the luminance included in the entire block can be eliminated, whereby the edge can properly be extracted. The edge direction can be derived with a simple calculation using only addition and subtraction, whereby the calculation load is light.

In the present embodiment, the range of voting upon the Hough transform may sometimes be limited based on the derived edge extending direction as described above by the later-described specific object determining unit 164. In the case where the derived value of the horizontal-direction component or the derived value of the vertical-direction component is simply used as the edge direction, there are a limitless number of variations in the edge direction. Then, it is necessary to set the voting range for the limitless number of the variations.

Therefore, in the present embodiment, the horizontal-direction component and the vertical-direction component are defined with a unit of length so as to simplify variations in the edge direction. Specifically, the horizontal-direction component and the vertical-direction component can both be regarded as any one of −1, 0, and +1. In so doing, the edge direction can be limited to 9 states that include 8 directions by 45 degrees each and a state with no direction where the horizontal-direction component and the vertical-direction component are both 0, as illustrated in FIG. 4F. This configuration can dramatically reduce the calculation load of the later-described specific object determining unit 164.

The position information obtaining unit 162 uses the stereo method to convert parallax information for target portion 220 in the detection area 122 of the distance image 126 into three-dimensional position information including the width direction x, the height direction y, and the depth direction z. The parallax information represents a parallax of each target portion 220 in the distance image 126, whereas the three-dimensional position information represents information about the relative distance of each target portion 220 in the real world. When the parallax information is not derived by the pixel but is derived by the block, that is, by a plurality of pixels, a calculation may be executed in units of pixels with the parallax information being deemed as parallax information about all the pixels which belong to a block.

FIG. 5 is an explanatory diagram for explaining conversion into three-dimensional position information by the position information obtaining unit 162. First, the position information obtaining unit 162 treats the distance image 126 as a coordinate system in a pixel unit as shown in FIG. 5. In FIG. 5, the lower left corner is adopted as an origin (0, 0). The horizontal direction is adopted as an i coordinate axis, and the vertical direction is adopted as a j coordinate axis. Therefore, a pixel having a parallax dp can be represented as (i, j, dp) using a pixel position i, j and the parallax dp.

The three-dimensional coordinate system in the real world. according to the present embodiment will be considered using a relative coordinate system in which the vehicle 1 is located in the center, The right side of the direction in which the vehicle 1 moves is denoted as a positive direction of X axis, the upper side of the vehicle 1 is denoted as a positive direction of Y axis, the direction in which the vehicle 1 moves (front side) is denoted as a positive direction of Z axis, and the crossing point between the road surface and a vertical line passing through the center of two image capturing devices 110 is denoted as an origin (0, 0, 0). When the road is assumed to be a flat plane, the road surface matches the X-Z plane (y=0) The position information obtaining unit 162 uses (formula 1) to (formula 3) shown below to transform the coordinate of the pixel (i, j, dp) in the distance image 126 into a three-dimensional point (x, y, z) in the real world.

$$x = CD/2 + z \cdot PW \cdot (i - IV) \quad \text{(formula 1)}$$

$$y = CH + z \cdot PW \cdot (j - JV) \quad \text{(formula 2)}$$

$$z = KS/dp \quad \text{(formula 3)}$$

Here, CD denotes an interval (baseline length) between the image capturing devices 110, Ph denotes a corresponding distance in the real world to a distance between adjacent pixels in the image, so-called like an angle of view per pixel, CH denotes an disposed height of the image capturing device 110 from the road surface, IV and JV denote coordinates (pixels) in the image at an infinity point in front of the vehicle 1, and KS denotes a distance coefficient (KS=CD/PW).

Accordingly, the position information obtaining unit 162 derives the height from the road surface on the basis of the relative distance of the target portion 220 and the detection distance in the distance image 126 between a point on the road surface located at the same relative distance as the target portion 220 and the target portion.

In the present embodiment, the Hough transform is executed based on the target portion 220 having the edge extracted by the edge extracting unit 160 and the relative distance z obtained by the position information obtaining unit 162. The Hough transform used in the present embodiment will briefly be described below.

Figure 6A:
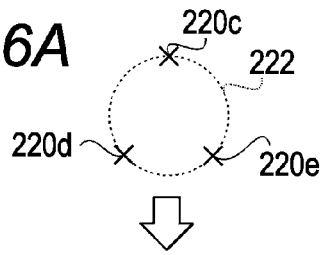
FIGS. 6A to 6E are explanatory diagrams for explaining a Hough transform.

FIGS. 6A to 6E are explanatory diagrams for explaining the Hough transform. It is assumed here that three target portions 220c, 220d, and 220e having an edge are extracted from the luminance image 124 as illustrated in FIG. 6A. These three target portions 220c, 220d, and 220e are originally a part of a circular specific object 222 such as a road sign. However, it is assumed here that the specific object cannot be clearly determined to have a circular shape from the luminance image 124.

The Hough transform is a technique of detecting a geometric shape such as a circle and a straight line from a plurality of points. It is based on a theory that a center of a circle that passes through any target portion 220 and that has a radius satisfying N is present on a circle with the radius N around the any target portion 220. For example, the center of the circle passing through the three target portions 220c, 220d, and 220e illustrated in FIG. 6A is on the respective circles around the three target portions 220c, 220d, and 220e. However, the radius N cannot be specified only with the information of the edges. Therefore, a plurality of radiuses N, each having a different size, is prepared. Voting is performed for pixels on each of the circles with the radius N of different size around each of three target portions 220c, 220d, and 220e. The radius N and the center of the specific object are specified using the pixels having the number of votes that is equal to or larger than a predetermined value set beforehand.

Figure 6B:
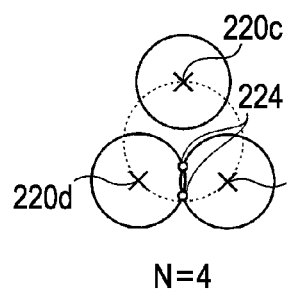
Figure 6C:
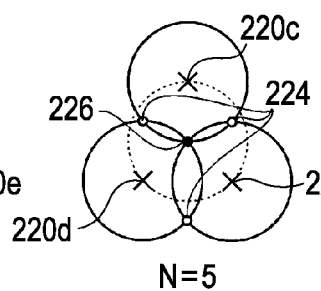
Figure 6D:
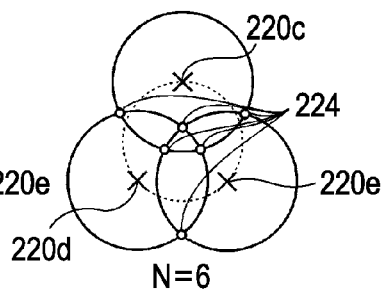

For example, as illustrated in FIGS. 6B, 6C, and 6D, circles with different radiuses of N=4, 5, and 6 are formed around each of three target portions 220c, 220d, and 220e, and voting is performed for pixels included on the trajectories of the circles (a unit index is associated with the pixels) Accordingly, the number of votes cast to two pixels 224 is 2 (two unit indexes are associated) in FIG. 6B. In FIG. 6C, the number of votes is 2 cast to three pixels 224, and the number of votes, cast to one pixel 226 is 3. Similarly, the number of votes cast to six pixels 224 is 2 in FIG. 6D.

Figure 6E:
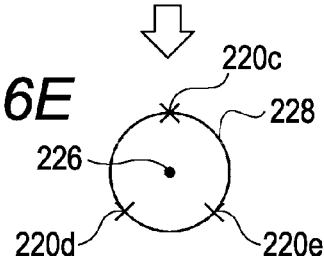

In this case, the pixel having the number of votes of 3 (that is not less than the predetermined value) is only the pixel 226. Therefore, this pixel 226 is defined as a center of the circle passing through the three target portions 220c, 220d, and 220e, and the radius N=5 for deriving the pixel 226 can be specified as the radius of the circle. In this way, a circle 228 passing through the three target portions 220c, 220d, and 220e is specified as illustrated in FIG. 6E.

In the present embodiment, the Hough transform is executed by using not only the information that a pixel has an edge as described above but also the relative distance in the depth direction z of the target portion 220. With this processing, the radius N of the specific object can be specified in advance. The specific object determining unit 164 realizing this processing will be described below.

The specific object determining unit 164 limits the target portions 220 having an edge which are subjected to the Hough transform before the execution of the Hough transform.

Figure 7:
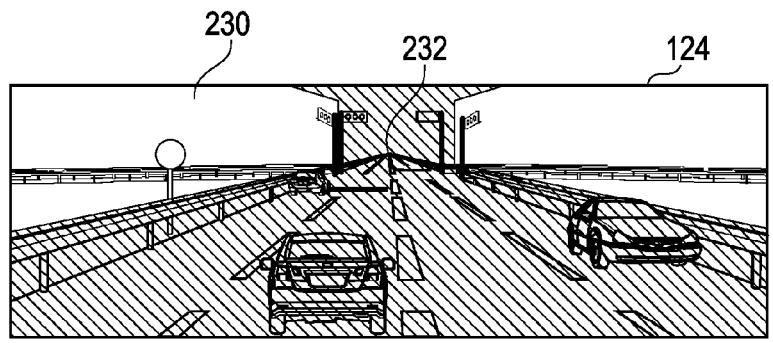
FIG. 7 is an explanatory diagram for explaining limiting processing of target portions by a specific object determining unit.

FIG. 7 is an explanatory diagram for explaining limiting processing of target portions by the specific object determining unit 164. When a specific object for which the determination is performed is one that is present only at the outside of a driving lane, such as a road sign, the specific object determining unit 164 performs the Hough transform only on target portions 220 included in a partial search region 230, excluding a hatched region in FIG. 7 where a road sign cannot be present. The partial search region 230 is defined based on the relative distance in the width direction z and the distance in the height direction y from the road surface obtained by the position information obtaining unit 162. For example, the partial search region 230 is within the range defined with a position corresponding to a road strip, such as relative distance in the width direction z≤100 m, and 1.0 m ≤distance in the height direction y from the road surface ≤5.0 m. Accordingly, the partial search region 230 is represented by a shape radially spreading toward the vehicle 1 from an infinity point 232 in the luminance image 124. In this manner, the region where the specific object is not present is excluded to avoid an unnecessary Rough transform of target portions 220, thereby reducing the processing load and forestall an erroneous detection in which a specific object appears in a region where it is supposed not to be present.

Next, the specific object determining unit 164 refers to the specific-object table retained in the data retaining unit 152 so as to obtain the shape information of the specific object under examination, and adapts the shape information to the relative distance in the depth direction z. For example, when the specific object is a road sign, the shape information indicates that the specific object has a circular shape, and the radius of the circle is 30 cm. When the road sign is located on the corresponding position in the depth direction z, the specific object determining unit 164 derives the length of the radius (pixel number) with which the specific object is displayed on the luminance image 124 is, by using inverse functions of the formulas (1) to (3).

Like the road sign, there is a specific object whose size is specified by a law or rule depending upon the type of the specific object. If the relative distance in the depth direction z is derived as in the present embodiment, the size of the specific object appearing on the luminance image 124 can be estimated.

Next, the specific object determining unit 164 performs the Hough transform on the target portion 220 having the edge by using the circle with the derived radius.

Figure 8A:
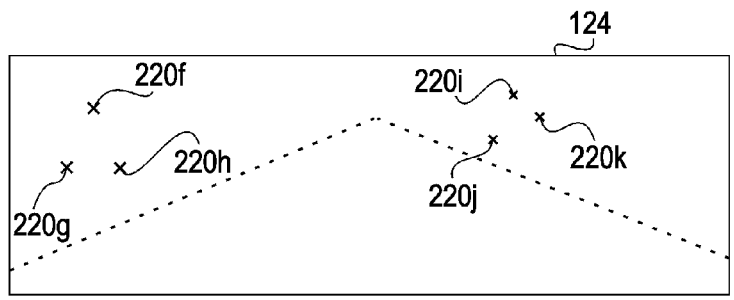
FIGS. 8A to 8D are explanatory diagrams for explaining Hough transforming processing in an embodiment of the present invention.
Figure 8B:
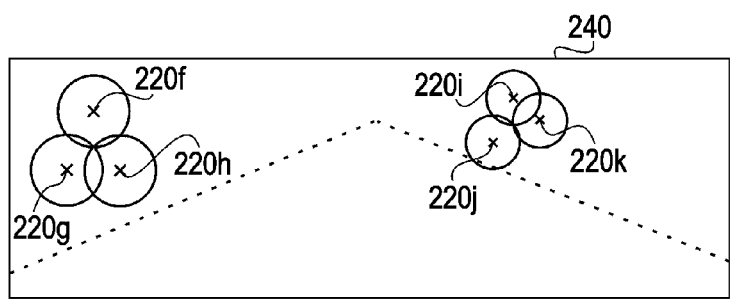
Figure 8C:
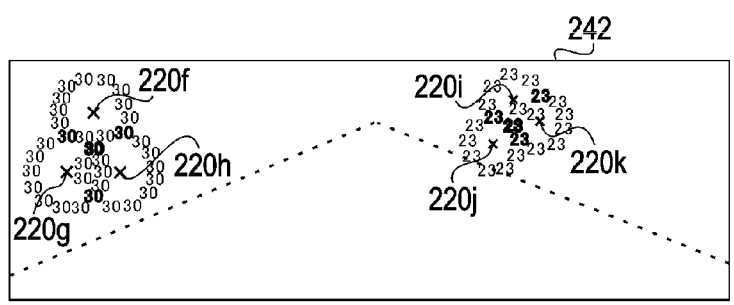
Figure 8D:
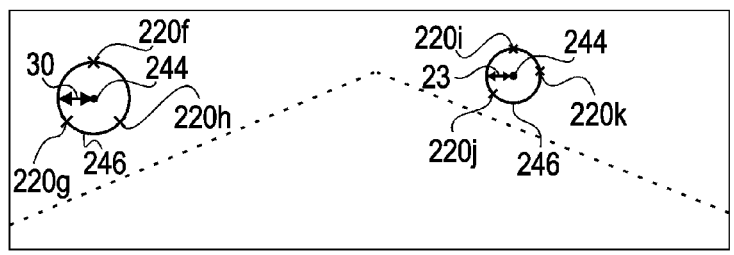

FIGS. 8A to 8D are explanatory diagrams for explaining Hough transforming processing in the embodiment of the present embodiment. FIG. 8A illustrates a luminance image 124, FIG. 8B illustrates a voting table 240 for the voting by the Hough transform, FIG. 8C is a radius retaining table 242 in which a radius N upon the voting is associated with a voted pixel, and FIG. 8D illustrates a shape of a specific object finally extracted. A dotted line in each figure corresponds to the driving lane in FIG. 7.

For example, it is assumed that target portions 220f, 220g, 220h, 220i, 220j, and 220k having an edge are extracted from the luminance image 224 in FIG. 8A. For the sake of convenience of description, the six target portions 220 (220f to 220k) are focused. The specific object determining unit 164 obtains the relative distance in the width direction z of each of the target Portions 220f, 220g, 220h, 220i, 220j, and 220k in FIG. 8A, and obtains a radius N of a circle on which the Hough transform is to be performed based on the relative distance in the width direction z. It is assumed here that the radius N of the target portions 220f, 220g, and 220h is 30 pixels, and the radius N of the target portions 220i, 220j, and 220k is 23 pixels.

The specific object determining unit 164 forms a circle with the radius N obtained for each of the target portions 220f, 220g, 220h, 220i, 220j, and 220k around each of them on the voting table 240 in FIG. 8B, and perform the voting for all pixels on the circle with the radius N. Therefore, each of pixels corresponding to the circles in FIG. 8B have associated therewith a unit index indicating that the voting is performed for it. At this time, the radius N upon the voting is associated with each pixel corresponding to a voted pixel on the radius retaining table 242 as indicated by a numerical value in FIG. 8C. It is to be noted that the radius N in FIG. 8C is only an imaginary view, and the relationship in FIG. 8C is different from the actual relationship between the number of pixels and the radius N.

In the present embodiment, the radius of the circle having as part thereof the target portion 220 can be specified. Therefore, it is unnecessary to provide the voting table for each size (radius) of a plurality of different circles as is conventionally required. Consequently, unnecessary Hough transform processing can be avoided, whereby the processing load can be reduced. However, as described above, when voting tables 240 are grouped together, the information of the radius N upon voting is lost. In view of this, the radius retaining table 242 corresponding to the voting table 240 is supplementarily provided, whereby a specific object can properly be specified.

Then, the specific object determining unit 164 detects the number of votes on the voting table 240. When a pixel whose number of votes is not less than the predetermined value (for example, 20) is detected, the specific object determining unit 164 reads the radius N (here, "30" and "23") associated with a pixel on the radius retaining table 242 corresponding to the detected pixel Then, the specific object determining unit 164 forms a circle 246 with the read radius N around the pixel 244 having the number votes not less than the predetermined and determines this circle 246 as the specific object as illustrated in FIG. 8D.

There may be the case where one pixel is a candidate for the centers of circles of a plurality of specific objects. This is she case where a plurality of radiuses N is associated with any pixel on the radius retaining table 242. The present embodiment needs only one specific object that can be recognized in an image. Therefore, only any one of the plurality of radiuses N may be employed. In the present embodiment, a specific object that is expected to be present in the foreground in the image is employed. Generally, if there are road signs with a same size, the road sign located in the foreground is displayed to be larger on the image. Accordingly, it is expected that the number of votes for this road sign is large. When a plurality of radiuses N are associated with the any pixel in the radius retaining table 242, the specific object determining unit 164 employs the radius N having a large number of votes, thereby being capable of extracting a specific object that is expected to be present in the foreground.

There may also be the case were circles indicating a specific object each have a different center and are partially overlapped. In this case, a specific object that is expected to be present in the foreground in the image is employed. If there are some road signs with a same size, the one located in the foreground is larger in the image, and its center is located on relatively a lower portico in the image, in general. Therefore, when detecting the number of votes, the specific object determining unit 164 starts the detection from the lower part of the image. Accordingly, the specific object determining unit 164 determines first a specific object located on the lower portion of the image, and does not consider the specific object located in she rear from this specific object. In the present embodiment, the specific object located in the foreground has to be preferentially extracted in order to execute appropriate control by the vehicle control device 240. Therefore, even if a specific object in the rear out of the overlapped specific objects is not considered, the control is hardly affected.

A further efficient Hough transform will be studied below, It has been known that, when a specific object is circular as in the present embodiment, a tangent line of the circle is Perpendicular to the segment linking the tangent point and the center of the circle. The tangent line of the circle corresponds to the edge extending direction in the target portion 220. Accordingly, the specific object determining unit 164 limits a position where a center of a circle having as part thereof the target portion 220 having an edge is located to a predetermined range vertical to the edge extending direction of the target portion 220. The predetermined range is an angular range radially spreading in the vertical direction around the target portion 220. The angular range is set to 45 degrees in the present embodiment.

Figure 9A:
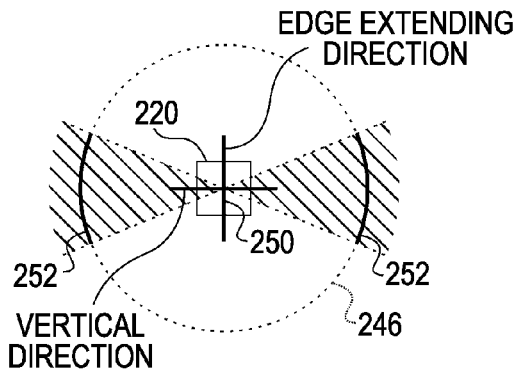
FIGS. 9A to 9D are explanatory diagrams for explaining voting processing by the specific object determining unit.

FIGS. 9A to 9D are explanatory diagrams for explaining another voting processing by the specific object determining unit 164. For example, when the Hough transform is performed on a target portion 220, a vote is casted to a circle 246 indicated by a broken line around the target portion 220 as illustrated in FIG. 9A. However, since the edge extending direction 250 of the target portion 220 is determined, the center of the circle of the specific object appears only in the direction vertical to the edge extending direction 250 of the target portion 220. Accordingly, the specific object determining unit 164 specifies the center of the circle of the specific object as focusing on the direction vertical to the edge extending direction 250 of the target portion 220.

Since the target portion 220 is small with respect to the specific object, the edge extending direction is not always same as the tangent line of the circle of the specific object. Therefore, the specific object determining unit 164 specifies not only the direction vertical to the edge extending direction 250 of the target portion 220 but also partial circle 252 in the predetermined range as a candidate of the center of the circle, in order to allow a deviation in a predetermined angle.

Figure 9B:
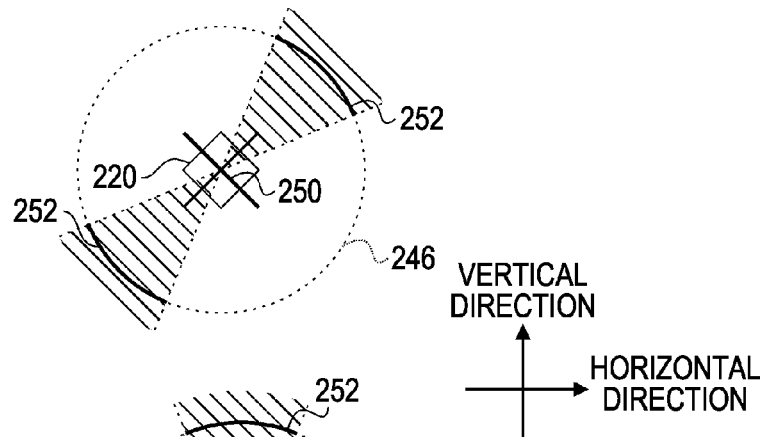
Figure 9C:
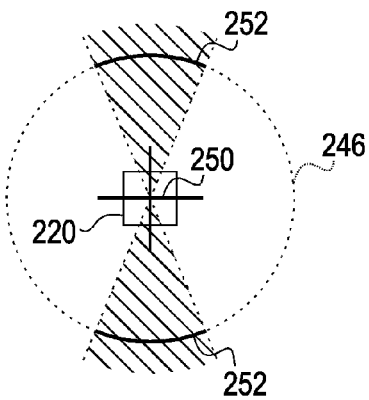
Figure 9D:
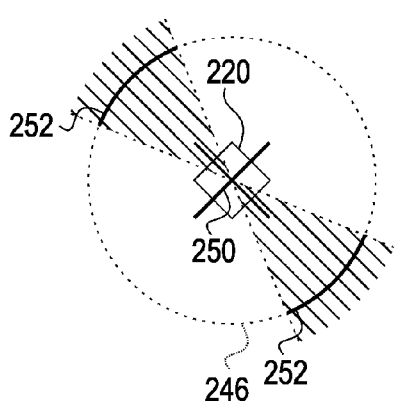

The edge extending direction 250 is represented by the four directions at an angle of 45 degrees each as illustrated in FIG. 4F, Therefore, as illustrated in FIGS. 9B to 9D, there are four specific patterns of partial circles 252 for the four directions of the edge extending direction 250. The circle 246 to which a vote is cast is limited to the partial circle 252, whereby the processing load can be reduced, and the specifying can be enhanced. Furthermore, the number of patterns for specifying the partial circle 252 is limited to four, and thus the processing load for obtaining the pattern can be reduced, and the specifying efficiency of can more be enhanced.

Furthermore, a vote is prevented from being cast to the range where the center of the circle of a specific object is not present can be avoided, whereby the center of the circle of the specific object is prevented from being erroneously detected due to an inappropriate voting to the pixel where the center of the circle of the specific object is supposed not to be present. Thus, the specific object determining unit 164 determines a specific object indicated by shape information, (Environment Recognition Method)

Figure 10:
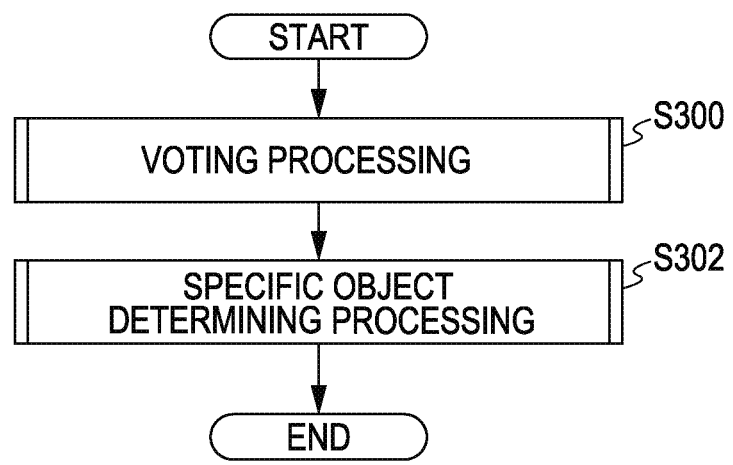
FIG. 10 is a flowchart illustrating an overall flow of an environment recognition method.
Figure 11:
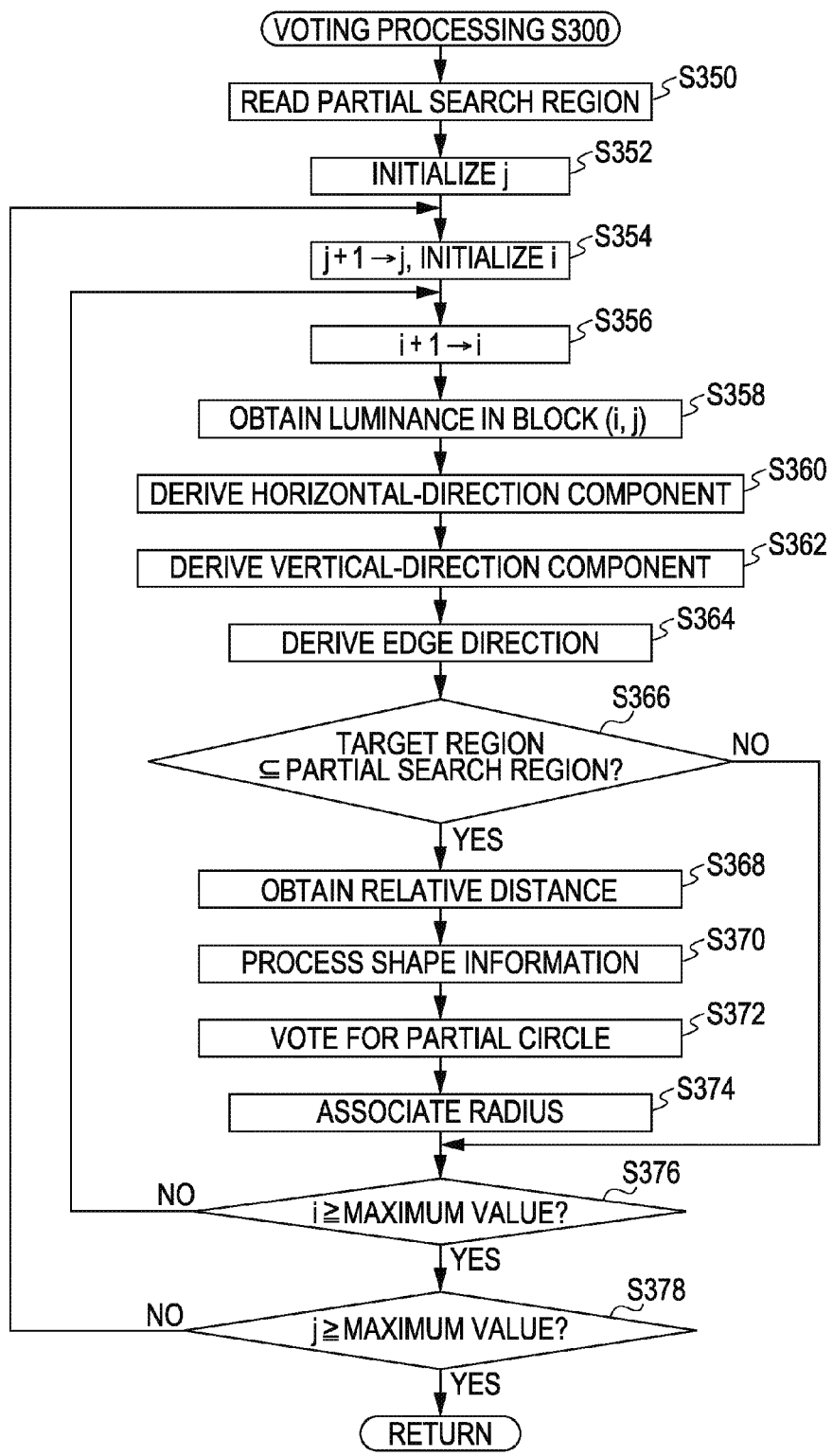
FIG. 11 is a flowchart illustrating a flow of voting processing.

Hereinafter, the particular processings performed by the environment recognition device 130 will be explained based on the flowchart shown in FIGS. 10 to 12. FIG. 10 illustrates an overall flow of interrupt processing when the image processing device 120 transmits the luminance image 124. FIGS. 11 and 12 illustrate subroutines therein. In this description, a block composed of 2×2 pixels are used as the target portion 220, and the lower left corners of the luminance image 124 having 600×200 pixels and the distance image 126 is the origin. The processing is performed according to the environment recognition method in a range of 1 to 300 blocks in the horizontal direction, and 1 to 100 blocks in the vertical direction of the image.

As shown in FIG. 10, when an interrupt occurs according to the environment recognition method in response to reception of the luminance image 124, the luminance image 124 obtained from the image processing device 120 is referred to, whereby the Hough transform is performed on a target portion 220 with an edge, and the voting is performed on the voting table 240 and the radius retaining table 242 (S300). The voting table 240 after the voting is referred to, whereby a specific object is determined (S302). Hereinafter, the above processing will be explained more specifically.

(Voting Processing S300)

As shown in FIG. 11, the edge extracting unit 160 reads the predetermined partial search region 230 based on the relative distance in the depth direction z and the distance in the height direction y from the road surface (S350). The edge extracting unit 160 initializes (substitutes "0" to) a vertical variable j for specifying the target portion 220 (S352). Next, the edge extracting unit 160 adds "1" to the vertical variable j, and initializes (substitutes "0" to) a horizontal variable i (S354). The edge extracting unit 160 then adds "1" to the horizontal variable i (S356). Here, the horizontal variable i and the vertical variable j are provided in order to execute the voting processing to all target portions 220 of 300×100.

The edge extracting unit 160 obtains the luminances of the 2×2 pixels in the target portion (i, j) from the luminance image 124 (S358). The edge extracting unit 160 derives the horizontal-direction component based on the formula of (A+B)−(C+D) (S360), and derives the vertical-direction component based on the formula of (A+C)−(B+D) (S362). Next, the edge extracting unit 160 specifies the edge extending direction through the simplification of the horizontal-direction component and the vertical--direction component, and assigns an edge extending direction identifier d (for example, one of the numbers illustrated in FIG. 4F) indicating the edge extending direction to the target portion 220, thereby defining the target portion as (i, j, d) (S364).

The specific object determining unit 164 then refers to the partial search region 230 read in step S350 so as to determine whether or not the target portion 220 is included, in the partial search region 230 (S366). When the specific object determining unit 164 determines that the target portion 220 is not included in the partial search region 230 (NO in S366), the flow proceeds to determining processing of the horizontal variable in step S376. When the target portion 220 is included in the partial search region 230 (YES in S366), the specific object determining unit 164 allows the position information acquiring unit 162 to obtain the relative distance in the depth direction z of the target portion 220 (S368). The specific object determining unit 164 obtains the shape information of the specific object from the specific-object table retained in the data retaining unit 152, and processes the shape information according to the relative distance in the depth direction z (S370). Specifically, the specific object determining unit 164 obtains a radius N of a circle on which the Hough transform should be performed based on the relative distance in the depth direction z.

The specific object determining unit 164 then adds "1" to a number of votes t a pixel (m, n, t) (votes for the pixel (m, n, t))

on a coordinate (m, n) of the partial circle 252 with the radius N within the predetermined range (the predetermined range vertical to the edge extending direction 250 of the target portion 220) specified by the edge extending direction identifier d in the voting table 240 (S372). At this time, the radius N upon the voting is associated with each pixel (m, n, N . . . ), corresponding to the voted pixel (m, n, t), in the radius retaining table 242 (S374).

Then, the specific object determining unit 164 determines whether or not the horizontal variable i is equal to or more than the maximum value of the horizontal blocks (in the present embodiment, 300) (S376), and when the horizontal variable i is less than the maximum value (NO in S376), the processings are repeated from the increment processing of the horizontal variable i in step S356. When the horizontal variable i is equal to or more than the maximum value (YES in S376), the specific object determining unit 164 determines whether or not the vertical variable j is equal to or more than the maximum value of the vertical blocks (in the present embodiment, 100) (S378). Then, when the vertical variable j is less than the maximum value (NO in S378), the processing's are repeated from the increment processing of the vertical variable j in step S354, When the vertical variable j is equal to or more than the maximum value (YES in S378), the voting processing is terminated. In this manner, the voting through the Hough transform involved with the target portion 220 is completed.

(Specific Object Determining Processing S302)

As shown in FIG. 12, the specific object determining unit t 164 initializes (substitutes "0" to) a vertical variable n for specifying a pixel (S400). Subsequently, the s specific object determining unit 164 adds "1" to the vertical variable n, and initializes (substitutes "0" to) a horizontal variable m (S402). Then, the specific object provisional determining unit 164 adds "1" to the horizontal variable m (S404).

Next, the specific object determining unit 164 extracts the pixel (m, n, t) and the pixel (m, n, N . . . ) from the voting table 240 and the radius retaining table 242 (S406), and extracts the radius N with the largest number of votes from one or a plurality of radiuses N (S408). The specific object determining unit 164 then determines whether the number of votes t of the extracted radius N is equal to or more than the predetermined value (S410). If it is less than the predetermined value (NO in S410), the flow proceeds to horizontal variable determining processing in step S414. If the number of votes t is equal to or more than the predetermined value (YES in S410), the specific object determining unit 164 determines that the circle with the radius N around the coordinate (m, n) of the pixel is a specific object (S412)

Next, the specific object determining unit 164 determines whether or not the horizontal variable m is equal to or more than the maximum value (in this embodiment, 600) (S414). If the horizontal variable m is less than the maximum value (NO in S414), the processings are repeated from incrementing processing of the horizontal variable m in step S404. If the horizontal variable m is equal to or more than the maximum value (YES in S414), the specific object determining unit 164 determines whether or not the vertical variable n is equal to or more than the maximum value of the vertical pixels (in this embodiment, 200) (S416). If the vertical variable n is less than the maximum value (NO in S416), the processings are repeated from the incrementing processing of the vertical variable n in step S402. If the vertical variable n is equal to or more than the maximum value (YES in S416), the specific object determining processing is terminated. In this manner, a specific object is specified.

As described above, the Hough transform processing applied in the environment recognition device 130 is well designed, whereby a processing load and a storage region in a memory can be reduced. Accordingly, the environment recognition device 130 can enhance the efficiency in specifying a target object. Specifically, since the relative distance in the width direction z is included in the Hough transform, and the radius N of the circle having as part thereof the target portion 220 is uniquely estimated, unnecessary Hough transforming processing with another radius N. Since only the voting table 240 and the radius retaining table 242 are used in the Hough transform, the memory capacity can be significantly reduced.

Furthermore, since the target portions 220 subjected to the Hough transform are limited to the partial search region 230, unnecessary Hough transforming processing can be eliminated. Furthermore, since the target objects to which voting is performed is limited to the partial circle 252, the processing load can significantly be reduced.

In addition, a program for allowing a computer to function as the environment recognition device 130 is also provided as well as a storage medium such as a computer-readable flexible disk, a magneto-optical disk, a ROM, a CD, a DVD, a BD storing the program. Here, the program means a data processing function described in any language or description method.

While a preferred embodiment of the present invention has been described hereinabove with reference to the appended drawings, it is to be understood that the present invention is not limited to such embodiment It will be apparent to those skilled in the art that various changes may be made without departing from the scope of the invention.

In the above embodiment, the three-dimensional position of the target object is derived based on the parallax between image data using the plurality of image capturing devices 110. However, the present invention is not limited to such case. Alternatively, for example, a variety of known distance measuring devices such as a laser radar distance measuring device may be used. In this case, the laser radar distance measuring device emits laser beam to the detection area 122, receives light reflected when the laser beam is irradiated the object, and measures the distance to the object based on the time required for this event.

In the embodiment described above, the image capturing device 110 obtains a color image. However, the present invention is not limited thereto. The present embodiment can be embodied by obtaining a monochrome image.

The above embodiment describes an example in which the position information obtaining unit 162 receives the distance image (parallax information) 126 from the image processing device 120, and generates the three-dimensional position information. However, the present invention is not limited to such case. The image processing device 120 may generate the three-dimensional position information in advance, and the Position information obtaining unit 162 may obtain the generated three-dimensional position information. Such a functional distribution can reduce the processing load of the environment recognition device 130.

In the above embodiment, the edge extracting unit 160, the position information obtaining unit 162, and the specific object determining unit 164 are configured to be operated by the central control unit 154 with software. However, the functional units may be configured with hardware.

The steps of the environment recognition method in this specification do not necessarily need to be processed chronologically according to the order described in the flowchart. The steps may be processed in parallel, or may include processings using subroutines.

The present invention can be used for an environment recognition device and an environment recognition method for recognizing a target object based on the luminances of the target object in a detection area.

The invention claimed is:

1. An environment, recognition device comprising:
    a data retaining unit that retains shape information that is information on a shape of a specific object;
    an edge extracting unit that obtains a luminance of each of target portions, formed by dividing a detection area of a luminance image, and extracts a target portion forming an edge;
    a position information obtaining unit that obtains a relative distance of the target portion forming an edge; and
    a specific object determining unit that determines a specific object indicated with the shape information by performing a Hough transform on a position of the target portion forming the edge based on the shape information according to the relative distance.

2. The environment recognition device according to claim 1, wherein the shape of the specific object is a circle.

3. The environment recognition device according to claim 2, wherein the specific object determining unit specifies a center of a circle on which a target portion forming an edge is, with limiting the presence of the center in a range vertical to a direction in which the edge extends.

4. The environment recognition device according to claim 3, wherein the position information obtaining unit also obtains a height of the target portion forming the edge from a road surface, and the specific object determining unit may determine a specific object indicated by the shape information only from the target portions included in a predetermined partial search region based on the relative distance and the height from the road surface.

5. The environment recognition device according to claim 2, wherein the position information obtaining unit also obtains a height of the target portion forming the edge from a road surface, and the specific object determining unit may determine a specific object indicated by the shape information only from the target portions included in a predetermined partial search region based on the relative distance and the height from the road surface.

6. The environment recognition device according to claim 1, wherein the position information obtaining unit also obtains a height of the target portion forming the edge from a road surface, and the specific object determining unit may determine a specific object indicated by the shape information only from the target portions included in a predetermined partial search region based on the relative distance and the height from the road surface.

7. An environment recognition method comprising:
    retaining beforehand shape information that is information on a shape of a specific object;
    obtaining a luminance of each of target portions, formed by dividing a detection area of a luminance image, and extracting a target portion forming an edge;
    obtaining a relative distance of the target portion forming an edge; and
    determining a specific object indicated with the shape information by performing a Hough transform on a position of the target portion forming the edge based on the shape information according to the relative distance.

* * * * *